(12) United States Patent
Bailey et al.

(10) Patent No.: US 11,886,642 B2
(45) Date of Patent: Jan. 30, 2024

(54) SYSTEM AND METHOD FOR INTEGRATED SURVEILLANCE AND COMMUNICATION INTO LIGHTING EQUIPMENT

(71) Applicant: Hubbell Incorporated, Shelton, CT (US)

(72) Inventors: Christopher Bailey, Greenville, SC (US); Timothy Willis, Clemson, SC (US); Thomas Hill, III, Spartanburg, SC (US); Pritam Yadav, Greenville, SC (US)

(73) Assignee: Hubbell Incorporated, Shelton, CT (US)

( * ) Notice: Subject to any disclaimer, the term of this patent is extended or adjusted under 35 U.S.C. 154(b) by 669 days.

(21) Appl. No.: 16/857,861

(22) Filed: Apr. 24, 2020

(65) Prior Publication Data
US 2020/0342238 A1    Oct. 29, 2020

Related U.S. Application Data

(60) Provisional application No. 62/933,657, filed on Nov. 11, 2019, provisional application No. 62/838,028, filed on Apr. 24, 2019.

(51) Int. Cl.
*G06T 7/292*    (2017.01)
*G06F 3/01*    (2006.01)
(Continued)

(52) U.S. Cl.
CPC .......... *G06F 3/017* (2013.01); *F21V 33/0052* (2013.01); *F21V 33/0056* (2013.01);
(Continued)

(58) Field of Classification Search
CPC ........ G06V 20/52; G06V 40/10; G06T 7/292; G06T 7/90; G06T 2207/30188;
(Continued)

(56) References Cited

U.S. PATENT DOCUMENTS 7,583,815 B2 *   9/2009   Zhang ................. G08B 29/188
                                                                    348/169
7,938,562 B2   5/2011   Ivey et al.
(Continued)

FOREIGN PATENT DOCUMENTS

WO    2016124917    8/2016

OTHER PUBLICATIONS

PCT/US2020/029808 International Search Report and Written Opinion dated Jul. 23, 2020 (17 pages).
(Continued)

*Primary Examiner* — Jayanti K Patel
*Assistant Examiner* — Richard B Carter
(74) *Attorney, Agent, or Firm* — Robinson + Cole LLP (57) ABSTRACT

A system including a first luminaire housing, a second luminaire housing, and a controller. The first luminaire housing includes a first light source configured to provide illumination to a first location, and a first I/O device configured to sense a first data set corresponding the first location. The second luminaire housing is separate from the first luminaire housing and includes a second light source configured to provide illumination to a second location, and a second I/O device configured to sense a second data set corresponding to the second location. The controller is configured to receive a portion of the first data set and a portion of the second data set, combine the portion of the first data set and the portion of the second data set to form a third data set corresponding to the first location and second location, and output the third data set.

36 Claims, 6 Drawing Sheets

(51) Int. Cl.
| | |
|---|---|
| *H04N 7/18* | (2006.01) |
| *H04N 5/265* | (2006.01) |
| *G06T 7/90* | (2017.01) |
| *H04R 1/08* | (2006.01) |
| *G05B 19/042* | (2006.01) |
| *F21V 33/00* | (2006.01) |
| *G06V 20/52* | (2022.01) |
| *G06V 40/10* | (2022.01) |
| *H04N 23/54* | (2023.01) |
| *H04N 23/90* | (2023.01) |
| *G06V 10/75* | (2022.01) |
| *A01C 23/00* | (2006.01) |
| *A01G 25/16* | (2006.01) |
| *A01C 23/04* | (2006.01) |
| *F21V 8/00* | (2006.01) |
| *G02B 21/36* | (2006.01) |

(52) U.S. Cl.
CPC ............ *G05B 19/042* (2013.01); *G06T 7/292* (2017.01); *G06T 7/90* (2017.01); *G06V 10/751* (2022.01); *G06V 20/52* (2022.01); *G06V 40/10* (2022.01); *H04N 5/265* (2013.01); *H04N 7/181* (2013.01); *H04N 23/54* (2023.01); *H04N 23/90* (2023.01); *H04R 1/08* (2013.01); *A01C 23/007* (2013.01); *A01C 23/042* (2013.01); *A01G 25/16* (2013.01); *G02B 6/0021* (2013.01); *G02B 21/362* (2013.01); *G05B 2219/25257* (2013.01); *G06T 2207/30188* (2013.01); *G06T 2207/30196* (2013.01); *G06T 2207/30232* (2013.01)

(58) Field of Classification Search
CPC . G06T 2207/30196; G06T 2207/30232; F21V 22/0052; F21V 33/0056; G05B 19/042; G05B 2219/25257; H04N 5/2253; H04N 5/247; H04N 5/265; H04N 7/181; H04R 1/08; A01C 23/007; A01C 23/042; A01G 25/16; G02B 6/0021; G02B 21/362; G06F 3/017
USPC ............................... 396/535; 348/169, 229.1
See application file for complete search history.

(56) References Cited

U.S. PATENT DOCUMENTS

| | | | |
|---|---|---|---|
| 8,422,889 B2 | 4/2013 | Jonsson | |
| 9,172,913 B1* | 10/2015 | Johnston | ............... G06V 10/145 |
| 9,472,955 B2 | 10/2016 | Jones et al. | |
| 9,671,071 B1 | 6/2017 | May | |
| 2014/0198218 A1* | 7/2014 | Afrooze | ................. H04N 23/73 |
| | | | 348/229.1 |
| 2016/0066515 A1 | 3/2016 | Palmieri, Jr. | |
| 2016/0125246 A1 | 5/2016 | Ryhorchuk et al. | |
| 2017/0011261 A1* | 1/2017 | Singh | ................... G06V 40/103 |
| 2017/0027045 A1 | 1/2017 | Chemel | |
| 2017/0215252 A1 | 7/2017 | Wells | |
| 2018/0315287 A1* | 11/2018 | Gray | ...................... H05B 47/11 |
| 2019/0034756 A1* | 1/2019 | Kim | ......................... G06T 7/70 |
| 2020/0279238 A1* | 9/2020 | Leake | ............. G06Q 20/40145 |

OTHER PUBLICATIONS

The Extended European Search Report dated Jan. 2, 2023, by the European Patent Office in corresponding European Patent Application No. 20796155.8. (6 pages).

* cited by examiner

SYSTEM AND METHOD FOR INTEGRATED SURVEILLANCE AND COMMUNICATION INTO LIGHTING EQUIPMENT

RELATED APPLICATIONS

This application claims priority to U.S. Provisional Patent Application No. 62/838,028, filed Apr. 24, 2019, and U.S. Provisional Patent Application No. 62/933,657, filed Nov. 11, 2019, the disclosure of both of which are hereby incorporated by reference.

FIELD

Embodiments relate to surveillance and communication systems, including such systems incorporated into lighting and control equipment.

SUMMARY

One embodiment provides a system including a first luminaire housing, a second luminaire housing, and a controller having an electronic processor and memory. The first luminaire housing includes a first light source configured to provide illumination to a first location, and a first input/output device (I/O) device configured to sense a first data set corresponding the first location. The second luminaire housing is separate from the first luminaire housing. The second housing includes a second light source configured to provide illumination to a second location, and a second I/O device configured to sense a second data set corresponding to a second location. The controller is configured to receive, via the first and second I/O devices, a portion of the first data set and a portion of the second data set, combine the portion of the first data set and the portion of the second data set to form a third data set corresponding to the first location and second location, and output the third data set.

Other aspects of the application will become apparent by consideration of the detailed description and accompanying drawings.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

Figure 1:
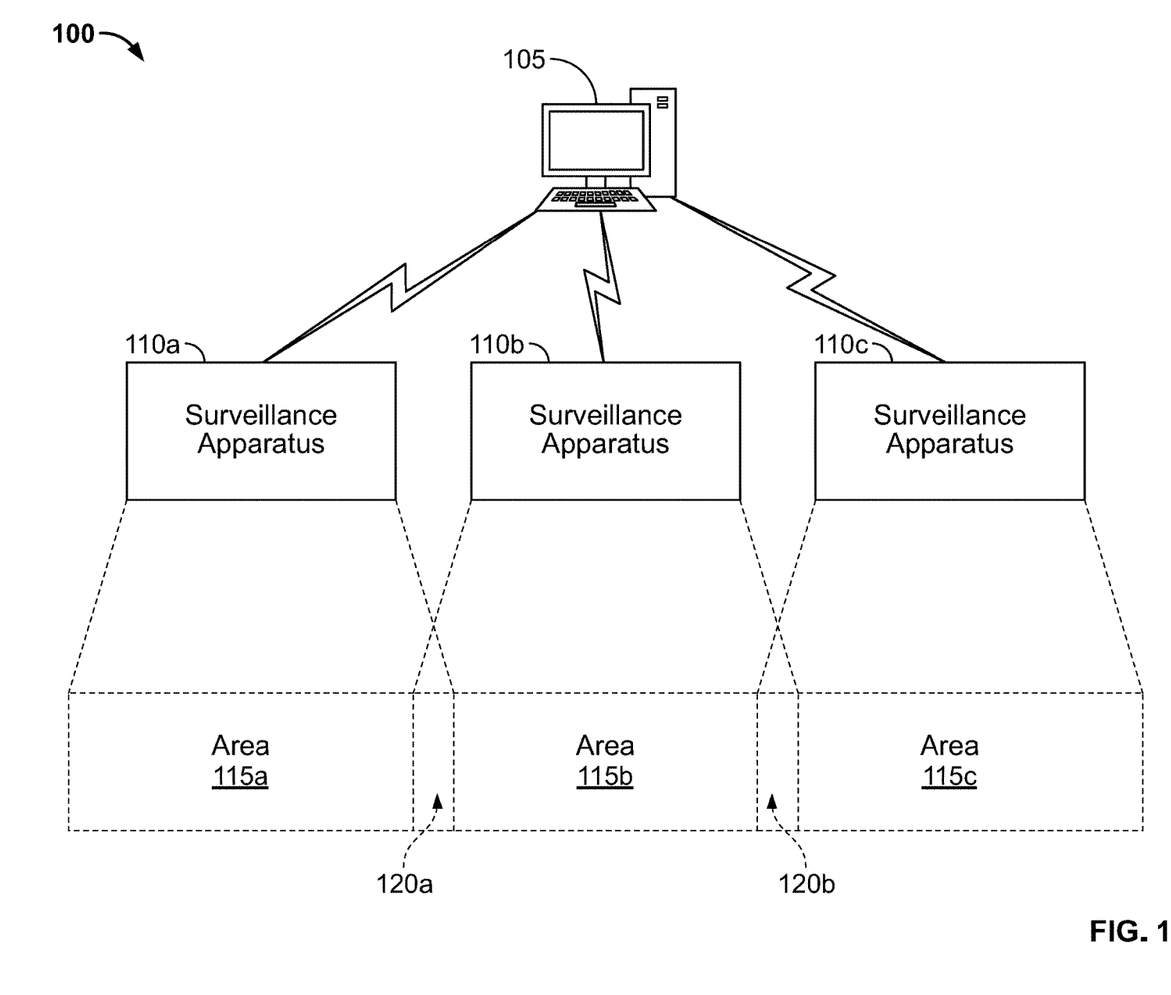
FIG. 1 is a block diagram illustrating a system according to some embodiments.

FIG. 1 is a block diagram of a system 100 according to some embodiments. In some embodiments, the system 100 is a surveillance system configured to provide monitoring. The system 100 includes a main computer 105 and one or more apparatuses 110, such as a surveillance apparatuses, (for example, 110a-110c) configured to provide surveillance of one or more areas 115 (for example, areas 115a-115c). For example, the areas 115 may be classrooms of a school or offices in an office building. As illustrated, in some embodiments the areas 115 surveilled by the apparatuses 110 may overlap forming one or more overlap areas 120 (for example, 120a, 120b).

Figure 2:
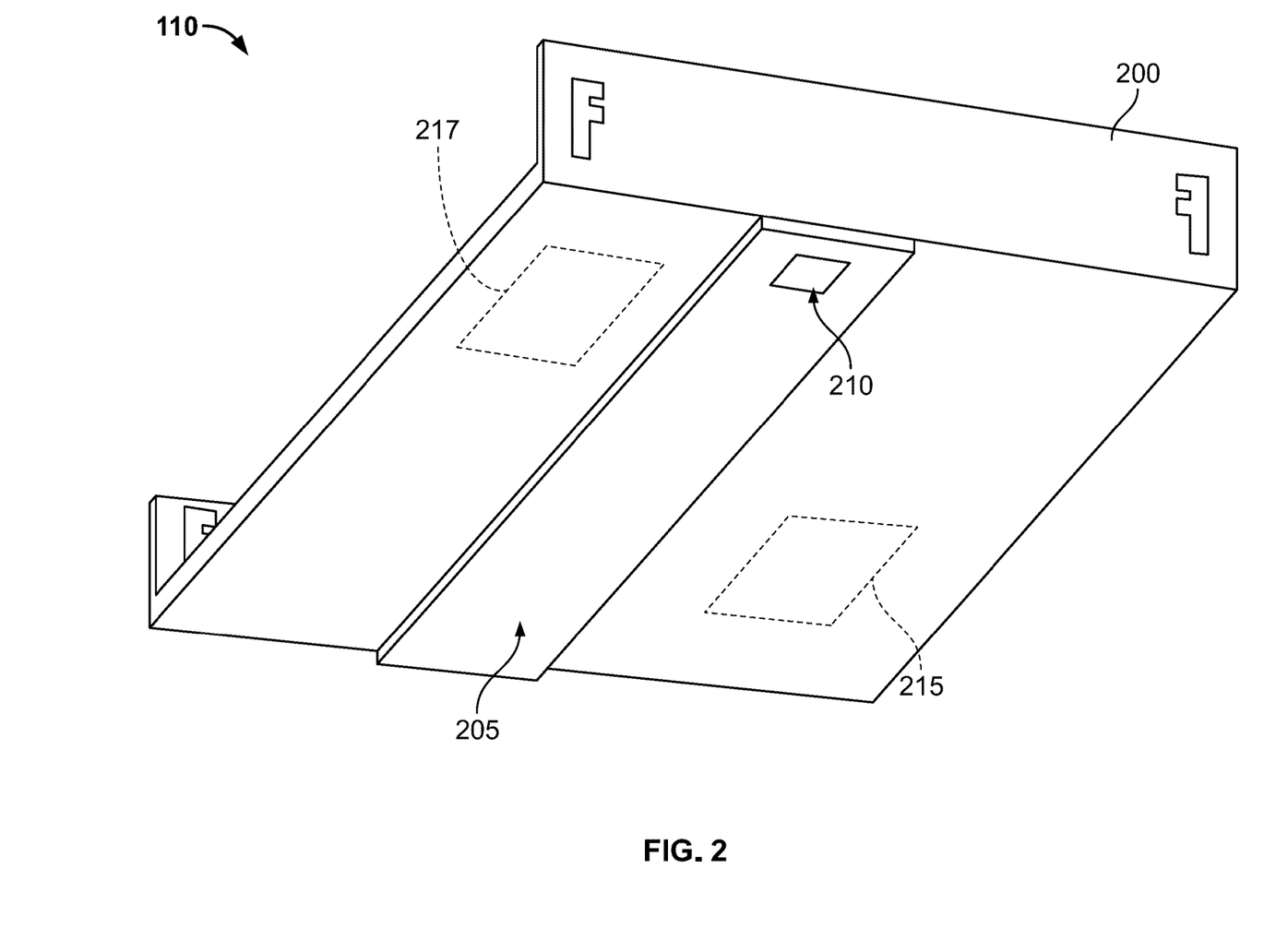
FIG. 2 is a perspective view illustrating an apparatus of the system of FIG. 1 according to some embodiments.

FIG. 2 is a perspective view of an apparatus 110 according to some embodiments. The apparatus 110 may include a housing 200. The housing 200 may be formed by a variety of materials, including but not limited to, plastics, metals, and glass. In the illustrated embodiment, the housing 200 is a luminaire housing configured to include, or contain, one or more light sources 205. The light sources 205 are configured to provide illumination to an area 115. The light source 205 may be, but are not limited to, incandescent lights, fluorescent lights, halogen lights, metal halide lights, organic light-emitting diodes (OLEDs), and light-emitting diodes (LEDs).

The apparatus 110 may further include one or more input/output (I/O) devices, such as but not limited to, a camera 210 and/or a microphone 215. The camera 210 is configured to capture one or more images of an area 115. In some embodiments, the camera 210 includes an optic setting (for example, via a fixed optic or electronically set optic) configured according to a spacing and/or mounting height of the apparatus 110 in order to capture the area 115 sufficiently. For example, the camera 210 may be a narrow-optic camera or a wide-angle camera. For example, the camera 210 may use digital zooming techniques and/or digital optimization techniques (such as bust not limited to, digital focusing techniques). In some embodiments, the camera 210 is configured to capture the area 115 in various light conditions. In some embodiments, the camera 210 may be a camera configured to capture reflected and/or radiated visible and non-visible spectra. In some embodiments, the camera 210 is configured to detect thermal radiation. The microphone 215 is configured to sense one or more sound characteristics of an area 115. In some embodiments, the housing 200 is configured to be mounted on a ceiling in an indoor space (for example, in a substantially similar manner as a luminaire apparatus) corresponding to an area 115. In other embodiments, the housing 200 is configured to be mounted in an outdoor environment (for example, used in conjunction with: outdoor roadway lighting, outdoor parking lot lighting, parking garage lighting, pathway lighting, commercial indoor lighting, and industrial indoor lighting). In some embodiments, the apparatus 110 further includes a controller having an electronic processor and memory and an input/output (I/O) device configured to provide communication between the apparatus 110 and the main computer 105. In some embodiments, the I/O devices may be a housing separate from a housing of the light source 205. In some embodiments, the apparatus 110 may not include a light source 205.

In some embodiments, the I/O devices further includes an a sound transducer, such as but not limited to, a speaker 217. In such an embodiment, the speaker 217 may output data from the main computer 105. In yet other embodiments, the I/O devices further include a moisture sensor, a global positioning system (GPS), a Human-Machine interface (HMI), a temperature sensor (for example, a thermocouple), an air sensor (for example, an $O_2$ sensor, an ozone sensor, etc.), an accelerometer, a gyroscope, a magnetometer, a humidity sensor, a barometer, a light sensor, an ultra-violet light sensor, an air quality sensor, an occupancy sensor, an anemometer, a LIDAR/time-of-flight sensor, a microwave sensor, an ultrasonic sensor, a radio-frequency (RF) sensor, a surface-acoustic wave (SWA) sensor, and/or a radar sensor.

In some embodiments, one or more I/O devices may be in a dormant state until activated. For example, one or more I/O devices may be activated via manual activation (for example, via a user) and/or via an input from another I/O device.

In some embodiments, one or more I/O devices (including camera 210 and/or microphone 215) may incorporate partial or full obscuration techniques. For example, the partial or full obscuration techniques may include masking techniques used to obscure the identity of one or more individuals located in the one or more areas 115. In such an embodiment, unmasking of one or more individuals may be performed based on activity of the one or more individuals. Additionally, in some embodiments, partial or full obscuration techniques may be based on user-set configurations and/or policy settings.

In some embodiments, the apparatus 110 further includes a power supply. The power supply is configured to provided power to the one or more light sources 205 and I/O devices (including but not limited to the camera 210 and/or the microphone 215). In some embodiments, the I/O devices receive power parasitically (for example, inductively and/or via wire) from the power supply. In some embodiments, the light sources 205 are LEDs, which receive power from an LED driver. In such an embodiment, the light source 205 and the I/O devices receive power via the LED driver. In other embodiments, the power supply may include an energy storage device (for example, a battery, one or more capacitors, etc.) and a charging device. In such an embodiment, the charging device receives power from the power supply and charges the energy storage device. The I/O devices may receive power from the energy storage device. In yet another embodiment, the I/O devices may receive power via power over Ethernet. In such an embodiment, the I/O devices may be communicative with the main computer 105 via Ethernet. In yet another embodiment, the I/O devices receive power via an independent power source, such as but not limited to, the I/O devices receive a low-voltage power via a low-voltage power source separate from a high-voltage power source.

Figure 3:
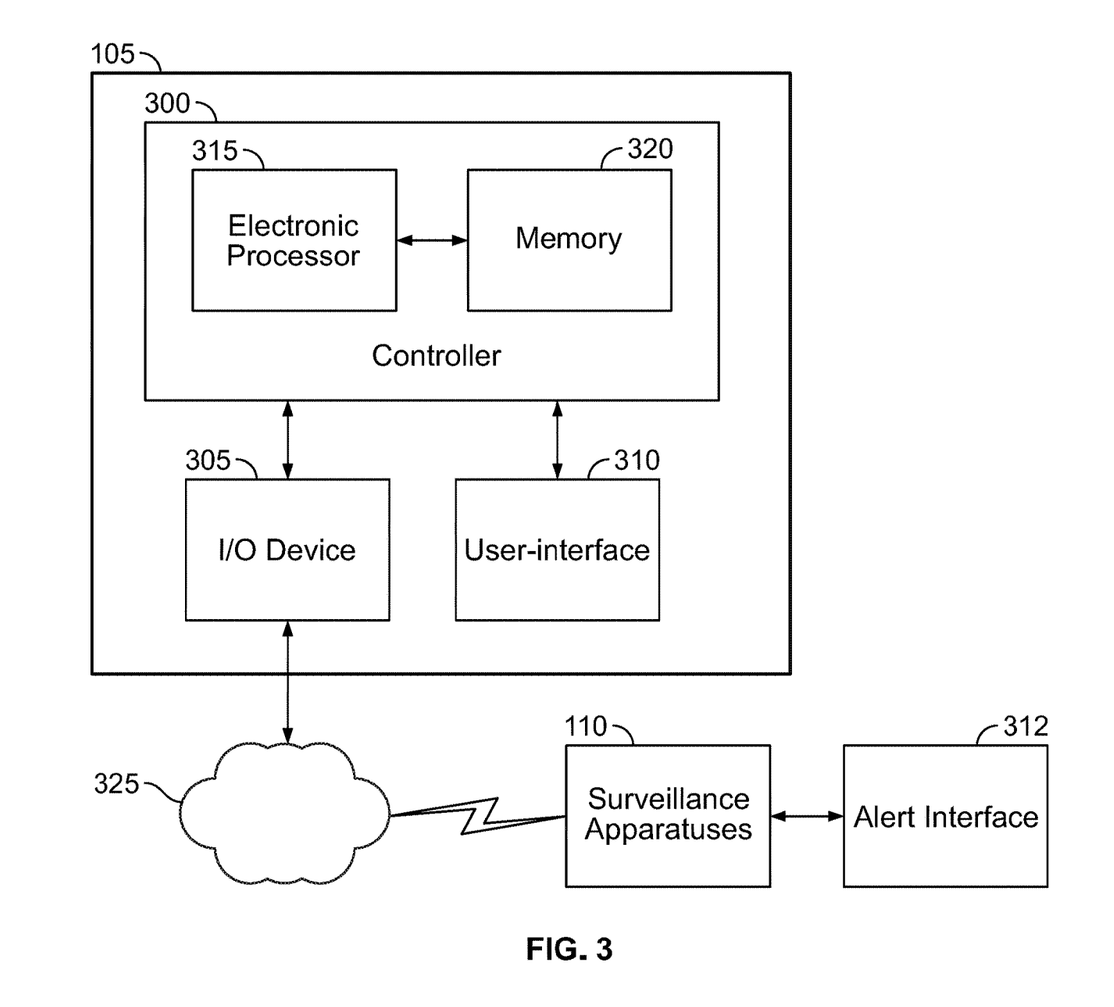
FIG. 3 is a block diagram illustrating a main computer and apparatus of the system of FIG. 1 according to some embodiments.

FIG. 3 is a block diagram of the main computer 105 according to some embodiments. The main computer 105 may include, among other things, a controller 300 electrically and/or communicatively coupled to an input/output (I/O) interface 305 and a user-interface 310.

In some embodiments, the controller 300 includes a plurality of electrical and electronic components that provide power, operational control, and protection to the components and modules within the controller 300 and/or the system 100. For example, the controller 300 includes, among other things, an electronic processor 315 (for example, a microprocessor or another suitable programmable device) and memory 320. The memory 320 includes, for example, a program storage area and a data storage area. The program storage area and the data storage area can include combinations of different types of memory, such as read-only memory (ROM), random access memory (RAM). Various non-transitory computer readable media, for example, magnetic, optical, physical, or electronic memory may be used. The electronic processor 315 is communicatively coupled to the memory 320 and executes software instructions that are stored in the memory 320, or stored on another non-transitory computer readable medium such as another memory or a disc. The software may include one or more applications, program data, filters, rules, one or more program modules, and other executable instructions.

The I/O interface 305 may be configured to input and output data from the main computer 105 to outside device (s), for example, through a network 325. The network 325 may be, for example, a wide area network (WAN) (e.g., a TCP/IP based network, a cellular network, such as, for example, a Global System for Mobile Communications [GSM] network, a General Packet Radio Service [GPRS] network, a Code Division Multiple Access [CDMA] network, an Evolution-Data Optimized [EV-DO] network, an Enhanced Data Rates for GSM Evolution [EDGE] network, a 3GSM network, a 4GSM network, a 5G network, a Digital Enhanced Cordless Telecommunications [DECT] network, a Digital AMPS [IS-136/TDMA] network, or an Integrated Digital Enhanced Network [iDEN] network, etc.). In other embodiments, the network is, for example, a local area network (LAN), a neighborhood area network (NAN), a home area network (HAN), or personal area network (PAN) employing any of a variety of communications protocols, such as Wi-Fi, Bluetooth, ZigBee, etc.

The user-interface 310 may be configured to output and/or receive information to/from a user. In some embodiments, the user-interface 310 includes a display (for example, a primary display, a secondary display, etc.), an indicator (for example, a light-emitting diode (LED)), and/or input devices (for example, touch-screen displays, a plurality of knobs, dials, switches, buttons, etc.). The display may be, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. Although illustrated as being included in, or along with, the main computer 105, in other embodiments, the user-interface 310 may be included in, or part of, the one or more apparatuses 110.

In general operation, main computer 105 receives information (for example, through the I/O interface 305 and the network 325) from one or more apparatuses 110. In some embodiments, the main computer 105 receives image/video data via the camera 210 and/or sound data via the microphone 215. The main computer 105 processes the information and outputs the information to a user via the user-interface 310. In some embodiments, the main computer 105 outputs the information to other systems (for example, other main computers, a main server, external computers, tablets, smartphones, etc.). In some embodiments, the main computer 105 outputs information via a short message service (SMS) and/or push notifications.

In some embodiments, the system 100 includes one or more alert interfaces 312. In some embodiments, the alert interface 312 is located proximate, and in communication with, an apparatus 110. For example, the alert interface 312 may be located within an area 115 surveilled by the apparatus 110.

The alert interface 312 may be configured to receive a user-input and alert the main computer 105 (for example, via the apparatus 110). In some embodiments, upon receiving the alert, the main computer 105 will provide a second user (for example, a user monitoring the main computer 105) that the alert interface 312 has been activated. In other embodiments, upon receiving the alert, the main computer 105 may alert outside parties (for example, security, police, etc.). In yet other embodiments, upon receiving the alert, the main computer 105 may record, and store in memory 320, image/video data and sound data from the area 115 (for example, via the apparatus 110) that the alert was received from. In such an embodiment, the main computer 105 may tag the recording to alert a user that an event was recorded.

The alert interface 312 may be configured to output an alert received from the main computer 105. For example, the alert interface 312 may output an alert (for example, an audible alert and/or a visual alert) to one or more individuals proximate the apparatus 110. In some embodiments, the alert may be a silent alert configured to alert one or more particular individuals proximate the apparatus 110 without alerting others.

In operation, the one or more I/O devices are configured to sense, or determine, one or more characteristics of areas 115. The I/O devices may then be configured to output the one or more characteristics as data sets corresponding to the one or more areas 115. For example, a first apparatus 110a may output a first data set corresponding to a first area 115a (or one or more characteristics of the first area 115a), while a second apparatus 110b may output a second data set corresponding to a second area 115b (or one or more characteristics of the second area 115b). In some embodiments, the main computer 105 receives the first and second data sets and form a third data set based on the first and second data sets. In some embodiments, the third data set is a combination of the first and second data sets. In such an embodiment, the combination may be algorithmically interpolated. For example, the third data set may be interpolated based on a position of an object (or individual). In such an example, an area outside of the first area 115a and the second area 115b may exist that is not monitored via an I/O devices. One or more characteristics of the area outside the first area 115a and the second area 115b may be interpolated based on the first and second data sets, along with additional information of the area (for example, geometric information).

Returning to FIG. 1, as stated above, in some embodiments the areas 115 surveilled by the apparatuses 110 may overlap forming one or more overlap areas 120 (for example, 120a, 120b). In such an embodiment, apparatuses 110 may output data sets (for example, video/image data and/or sound data) to the main computer 105. In some embodiments, apparatus 110a outputs a data set corresponding to area 115a and overlap area 120a; apparatus 110b outputs a data set corresponding to area 115b, overlap area 120a, and overlap area 120b; and apparatus 110c outputs a data set corresponding to area 115c, overlap area 120b. In some embodiments, bandwidth may be reduced by removing redundancy of data corresponding to the overlap areas. For example, in some embodiments, apparatus 110a outputs a data set corresponding to area 115a and overlap area 120a; apparatus 110b outputs a data set corresponding to area 115b and overlap area 120b; and apparatus 110c outputs a data set corresponding to area 115c.

Figure 4A:
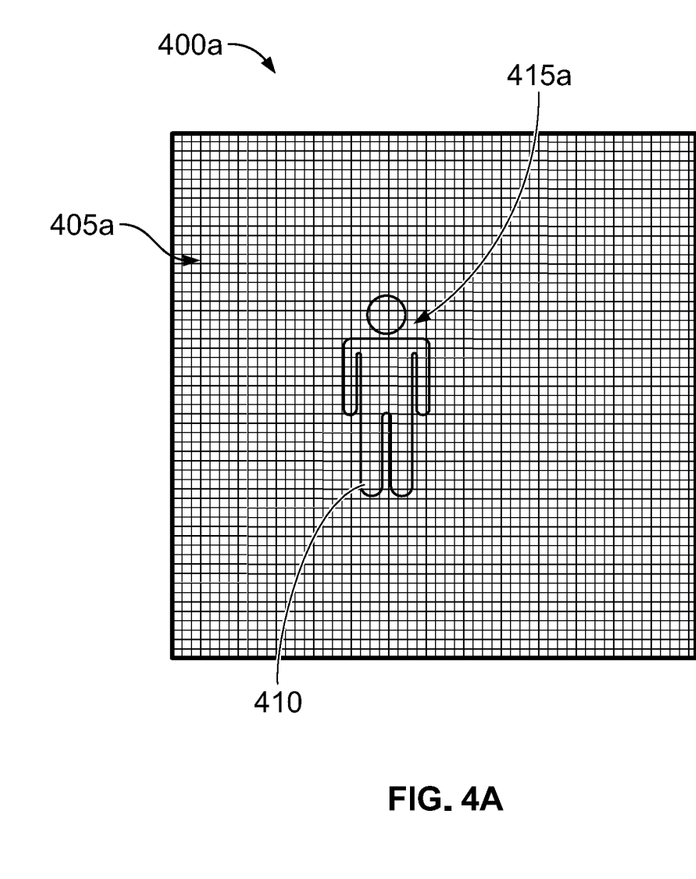
FIGS. 4A and 4B illustrate an image captured by a camera of the apparatus of FIG. 2 according to some embodiments.
Figure 4B:
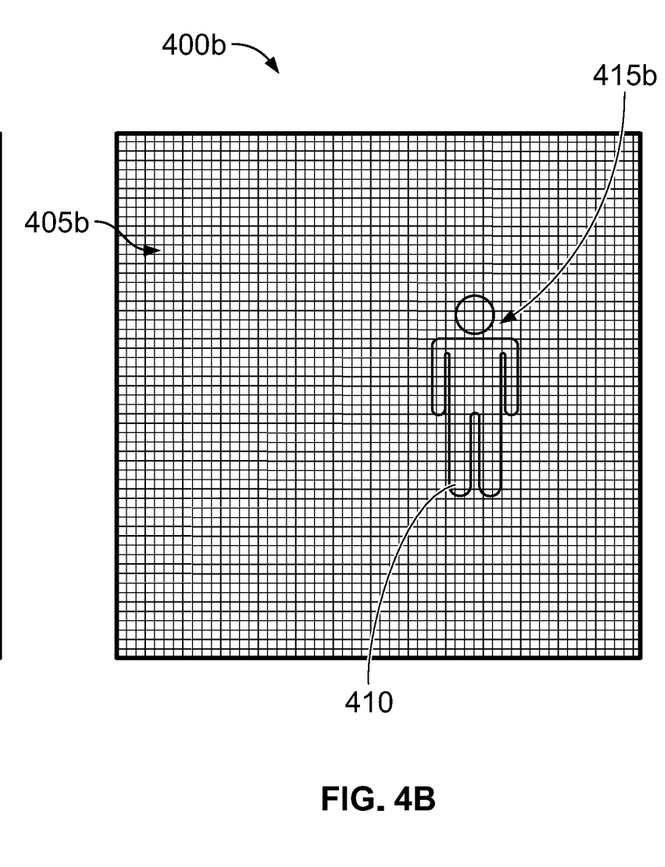

As illustrated in FIGS. 4A & 4B, in one embodiment of operation, the main computer 105 receives a plurality of images 400a, 400b from one or more cameras 210 of one or more apparatuses 110. In such an embodiment, each image 400a, 400b may include a plurality of pixels 405a, 405b. In some embodiments, the main computer 105 may only receive pixels of each image wherein movement is indicated. For example, exemplary image 400a illustrates an object 410 (for example, a person) at a first location, while exemplary image 400b illustrates the object 410 at a second location. While each image 400a, 400b includes a plurality of pixels 405, only pixels 415a, 415b may indicate movement. For example, pixels 415 may be determined by comparing pixels 405a and 405b. Pixels which are static indicate no motion, while pixels having a change (for example, a change in brightness level) may indicate motion. As stated above, in some embodiments, the main computer 105 may only receive pixels which indicate motion. Such an embodiment may reduce bandwidth necessary to transfer image data from the one or more cameras 210 to the main computer 105, and thereby increase transfer speed.

In some embodiments, the main computer 105 receives data from the I/O devices according to a time period. For example, the main computer 105 may receive video/image data from the one or more I/O devices according to a predetermined or variable frequency (for example, variable based on available bandwidth used by system 100, variable based on activity (for example, fast movement, a loud noise etc.), etc.). In some embodiments, the time period may be based on a speed of movement of object 410. For example, the time period may be greater when the speed of movement of the object 410 is slow, while the time period may less when the speed of movement of the object 410 speeds up. In some embodiments, during low bandwidth availability, data may be cached (for example, in memory) by the one or more apparatuses 110 and output to the main computer 105 upon bandwidth increasing.

Figure 5:
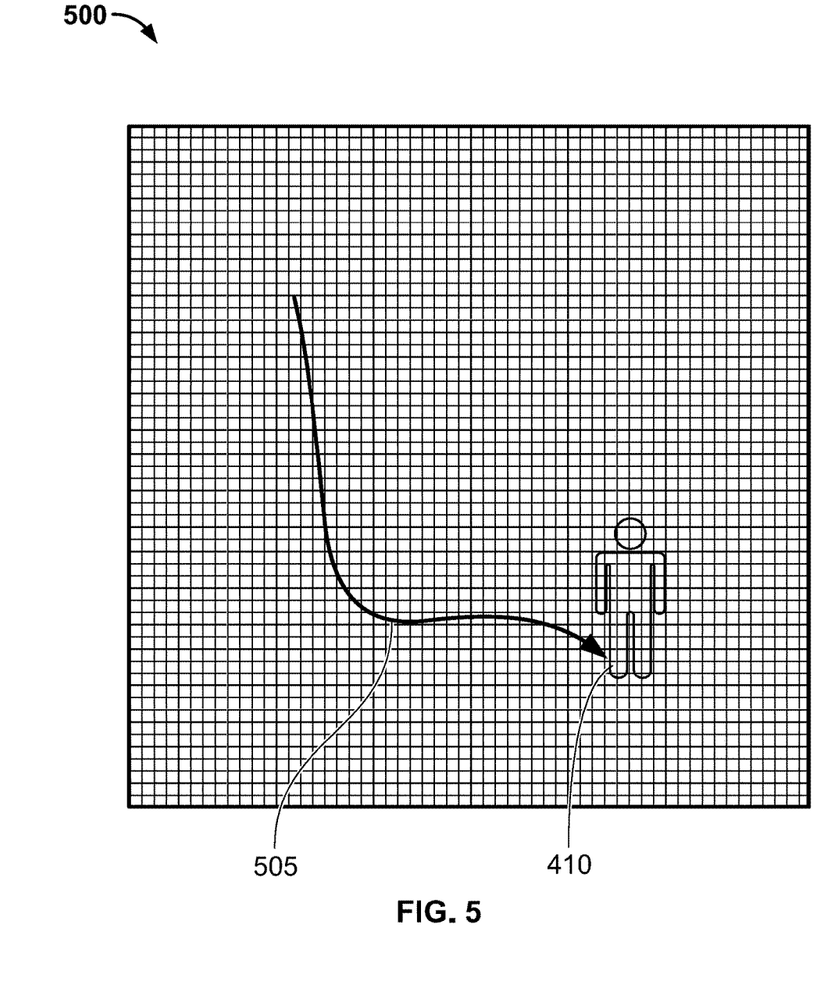
FIG. 5 illustrates an image captured by a camera of the apparatus of FIG. 2 according to some embodiments.

FIG. 5 illustrates an image 500 illustrating a motion trail 505 of an object 410 according to some embodiments. The motion trail 505 illustrates the movement of the object 410. In some embodiments, the motion trail 505 corresponds to one or more pixels associated with a decreased time period. In such an embodiment, the motion trail 505 illustrates movement of an object within the image 500 based on any activity (for example, an object having a speed of movement above a threshold).

Figure 6:
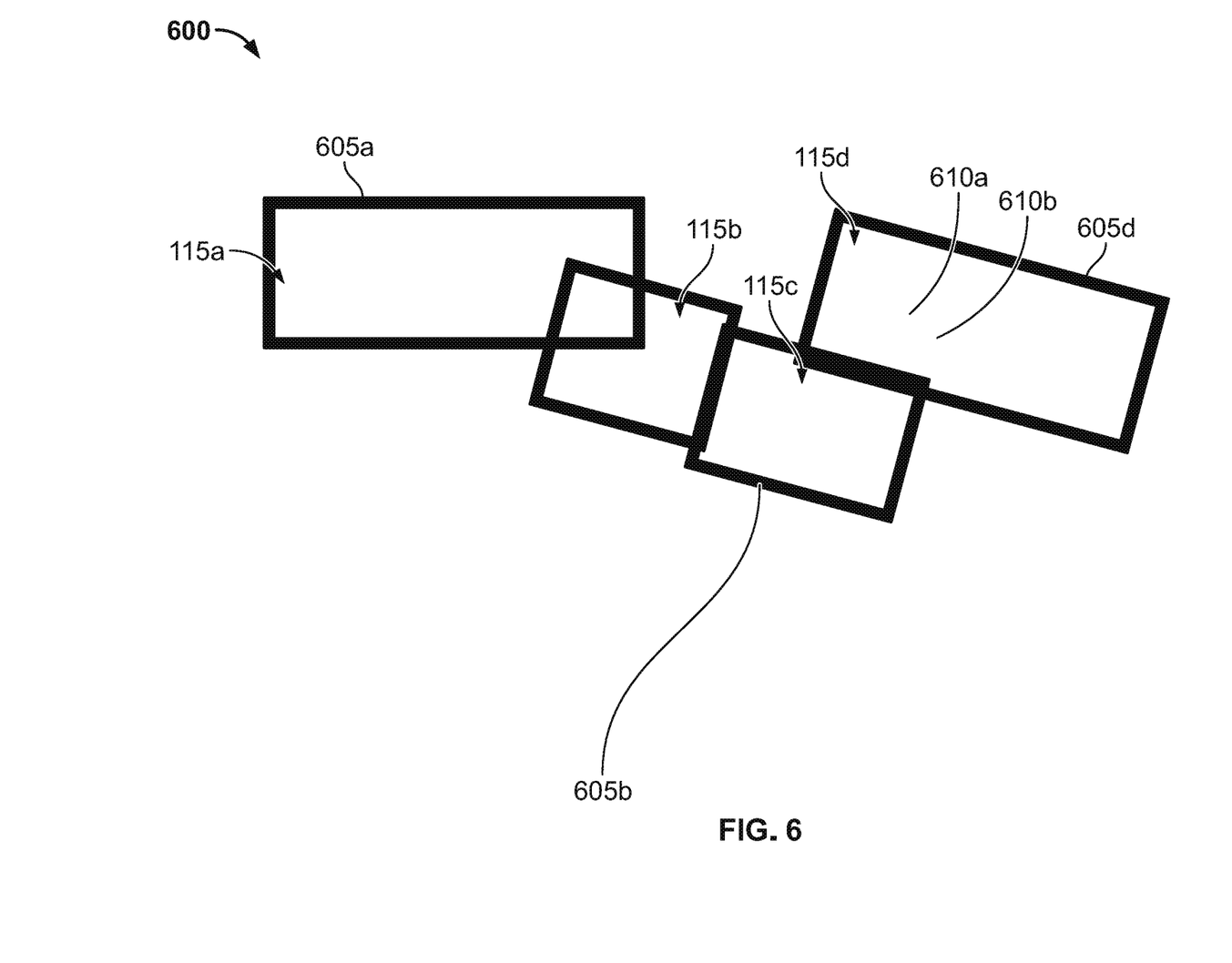
FIG. 6 illustrates an image captured by one or more cameras of one or more apparatuses of the system of FIG. 1 according to some embodiments.

FIG. 6 illustrates an image 600 according to some embodiments. Image 600 is a mesh image including a plurality of images 605 (including but not limited to images 605a, 605b, 605c, 605d) meshed together to illustrate a plurality of areas 115 (including but not limited to areas 115a, 115b, 115c, 115d). In some embodiments, main computer 105 receives the plurality of images 605, analyzes the images 605, and meshes the analyzed images 605 to form image 600. In some embodiments, the main computer 105 uses a multiplexer to analyze images 605 and form image 600. In some embodiments, the main computer 105 uses an algorithm to analyze the images 605 and form image 600.

As stated above, the main computer 105 further receives sound data (for example, including but not limited to, sound data corresponding to a sound property including, but not limited to, an amplitude, a frequency, and a waveform) from one or more apparatuses 110. As illustrated in FIG. 6, the main computer 105 may display, in image 600, a source of sound 610 (for example, a first source 610a and a second source 610b). The main computer 105 may further determine one or more characteristic of an area 115 and/or a source of sound 610 based on the received sound data. In some embodiments, the main computer 105, based on sound data, determines a location of the source of sound 610 within one or more of the areas 115. In some embodiments, the main computer 105 may determine a location based on amplitude and/or direction of the source of sound 610. For example, a greater amplitude may imply a source of sound 610 that is closer to the microphone 215, while a lower amplitude may imply a source of sound 610 that is further away from the microphone 215 of the apparatus 110.

In some embodiments, the main computer 105, based on data received from apparatuses 110, determines a type of event associated with a source of the data. For example, with respect to FIG. 6, the main computer 105, based on the sound data, determines a type of sound associated with a source of sound 610 within one or more areas 115. For example, the main computer 105, based on the sound data, may determine if the source of sound 610 is a text book falling onto the ground or a firearm. In some embodiments, main computer 105 determines the type of sound based on an analysis of a waveform of the sound.

In some embodiments, the main computer 105 receives sound data from one or more microphones 215 in a similar manner as described above with image/video data received from one or more cameras 210. For example, duplicate sound data, such as sound data generated within an overlap area 120, may be output via a single apparatus 110.

In some embodiments, the main computer 105 uses machine learning. In such an embodiment, the main computer may use machine learning to improve accuracy of analysis. For example, the main computer 105 may use machine learning to improve the accuracy of analysis of one or more characteristics sensed by the camera 210 and/or the microphone 215. For example, the main computer 105 may use machine learning to continually improve analysis of waveforms of generated sounds. The machine learning may be used to better determine the type of sound generated.

In some embodiments, the main computer 105 may further communicate (for example, via the I/O interface 305 and network 325) with other computers and/or servers. In such an embodiment, a main computer 105 located at a first location (for example, a first school, a first office, etc.) may communicate with a main computer located at a second location (for example a second school, a second office, etc.). Such communication may be performed to improve accuracy of the analysis of one or more characteristics sensed by the cameras and/or the microphones located at the first and second locations.

The system 100 may be a standalone system and/or integrated into, or communicate with, other systems. In some embodiments the other systems may include, but are not limited to, a security system, a building management system (for example, via BACnet, Modbus, LonTalk NX, EnOcean, SNMP, etc.) a fire alarm system, infrastructure (for example, via ICCP, NDP 3.0, UCA 2.0, SCADA, IP, etc.). In some embodiments, the system 100 may be integrated into, or communicate with, other systems using an application programming interface (API). In some embodiments, the system may include, or use, physical outputs such as, but not limited to, relays, actuators, and dimmers.

The system 100 may be integrated into, or communication with lighting control systems, including but not limited to, wireless lighting control systems, energy optimization systems, presence sensing systems, human-centric and ecological systems, and component (for example, TVSS) failure alerts. The system may also be integrated into, or communication with imaging applications, for example, object detection systems, traffic monitoring systems, general surveillance systems, infrared thermography systems, parking spot monitoring systems, license plate recognition systems, and vehicle and pedestrian counting systems. The system 100 may also be integrated into, or communication with microphone applications, for example, ballistic detection systems, ambient noise level systems, crowd detection systems, and equipment failure detection systems.

The system 100 may also be integrated into, or communication with external sensor applications, for example, snow level monitoring systems, storm water & sewer monitoring systems, sewer level monitoring, and waste management asset monitoring systems. The system 100 may also be integrated into, or communication with environmental sensing systems, such as air quality/chemical monitoring systems. The system 100 may also be integrated into, or communication with peripheral support systems, for example, bike-share services, vehicle charging stations, seasonal, venue, and hotspot power. The system 100 may also be integrated into, or communication with location and wayfinding services, such as BLE asset tracking/management, location and advertisement beaconing, digital signage, wayfinding, marketing, and emergency call buttons. The system 100 may also be integrated into, or communication with DRAS, BAS/BMS, facility floorplans, work order management systems, access control and security systems, utility AMI, third party sensors, third party wireless systems, and public service vehicles.

In some embodiments, the system 100 is configured to received gesture controls (for example, human gesture controls) and/or interpret human movement/activities. In such an embodiment, the system 100 may use one or more cameras 210 and/or one or more microphones 215 of one or more surveillance apparatus 110. Furthermore, in such embodiment, the gesture controls may be used to control/aim one or more cameras 210 and/or light sources 205. Gestures may further include emergency gestures (for example, a human waving their arms rapidly and/or a human stating "HELP"). In some embodiments, such emergency gestures may be used in a hospital setting to determine that a patient is in need of assistance. In some embodiments, the system 100 may be configured to read and interpret quick response (QR) codes. In some embodiments, the microphone(s) 215 may be configured to receive voice controls for operating the system 100.

Furthermore, the system 100 may be configured to identify human movement/activities. For example, the system 100 may be configured to identify aggressive human behaviors, such as but not limited to, pulling out weapons, fighting, etc. Additionally, in some embodiments, the system 100 may be configured to identify certain objects, for example, but not limited to, weapons.

In some embodiments, the system 100 may be controlled via an external device (for example, a touch screen, a tablet, an external computer, a smart phone, etc.). In such an embodiment, the system 100 may be controlled by touch screen inputs. Additionally, in such an embodiment, the system 100 may be controlled via gyroscopic/accelerometer inputs. For example, the external device's position and orientation may be used to enable/disable one or more features (for example, the light source(s) 205, the camera(s) 210, and/or the microphone(s) 215).

In some embodiments, the system 100 may be configured to sense/determine the presence of one or more people and/or objects. In such an embodiment, the system 100 may use radio-frequency (RF), Bluetooth, and/or WiFi. Based on the detection of specific people and/or objects, the system 100 may control various room settings. For example, upon a specific person entering a room, the room setting may be controlled to the specific person's preferred setting (for example, heating, lighting, etc.).

In some embodiments, rather than ceiling mounted, the surveillance apparatus 110 may be wall mounted, pole mounted, pendant mounted, stand-alone, etc.

In yet additional embodiments, the system 100 may be used in horticultural settings. In such embodiments, the system may be used to detect color of plants (for example, grass) and control irrigation and/or fertigation systems based on the detected color. Additionally, the system 100 may take into account various other factors, such as but not limited to, sensed and/or derived environmental historical, real-time, and/or forecasted factors, such as but not limited to, temperature, humidity, wind speed, daylight, barometric pressure, etc.

In such an embodiment, the system 100 may further be configured to detect growth stages of plants via the camera(s) 210 (and/or color sensors). For example, the system 100 may be determined to detect germination stage, general growth stages, and/or flowering stages. The system 100 may then activate irrigation or fertigation systems based on the stage(s). Considerations may also be made with respect to sensed or derived environmental historical, real-time, and/or forecasted factors, such as but not limited to, temperature, humidity, wind speed, daylight, barometric pressure, etc.

Embodiments provide, among other things, an improved surveillance system. Various features and advantages of the application are set forth in the following claims.

What is claimed is:

1. A system comprising:
a first luminaire housing including
a first light source configured to provide illumination to a first location, and
a first input/output (I/O) device configured to sense a first data set corresponding to the first location;
a second luminaire housing separate from the first luminaire housing, the second housing including
a second light source configured to provide illumination to a second location, and
a second I/O device configured to sense a second data set corresponding to the second location; and
a controller having an electronic processor and memory, the controller configured to:
receive, via the first and second I/O devices, a portion of the first data set and a portion of the second data set,
combine the portion of the first data set and the portion of the second data set to form a third data set corresponding to the first location and second location, and output the third data set;
wherein the first I/O device is a first camera and the second I/O device is a second camera, and the portion of the first data set and the portion of the second data set include pixels indicating movement.

2. The system of claim 1, wherein the first location and the second location overlap to form an overlap location.

3. The system of claim 2, wherein the portion of the first data set does not include the overlap location.

4. The system of claim 2, wherein the one or more room settings are controlled based on the presence of the person.

5. The system of claim 1, wherein the portion of the first data set and the portion of the second data set are received by the controller according to a time period.

6. The system of claim 5, wherein the time period changes based on activity of an object within at least one selected from a group consisting of the first location and the second location.

7. The system of claim 1, wherein the third data set includes a motion trail of an object moving within at least one selected from a group consisting of the first location and the second location.

8. The system of claim 1, wherein the first I/O device includes a microphone configured to sense a property of a sound at the first location.

9. The system of claim 8, wherein the sound property includes at least one selected from a group consisting of an amplitude, a frequency, and a waveform.

10. The system of claim 8, wherein the controller is further configured to receive, via the microphone, data corresponding to the sound property.

11. The system of claim 10, wherein the controller is further configured to determine, based on the data, a location within the first location of a source of the sound.

12. The system of claim 10, wherein the controller is further configured to determine, based on the data, a type of sound associated with a source of the sound.

13. The system of claim 10, wherein the controller is further configured to:
compare a first sound property to a second sound property; and
determine, based on the comparison, a type of sound associated with a source of the sound.

14. The system of claim 1, wherein the first luminaire housing is configured to be mounted on a ceiling.

15. The system of claim 1, wherein the I/O device includes at least one selected from a group consisting of a microphone, a speaker, a transducer, a moisture sensor, a global positioning system (GPS), a Human-Machine interface (HMI), a temperature sensor, an air sensor, an accelerometer, a gyroscope, a magnetometer, a humidity sensor, a barometer, a light sensor, an ultra-violet light sensor, an air quality sensor, an occupancy sensor, an anemometer, a time-of-flight sensor, a microwave sensor, an ultrasonic sensor, a radio-frequency (RF) sensor, a surface-acoustic wave (SWA) sensor, and a radar sensor.

16. The system of claim 1, further comprising an alert interface configured to receive a user-input.

17. The system of claim 16, wherein the alert interface is located within the first location and outputs an alert to the controller.

18. The system of claim 1, wherein the first I/O device receives power parasitically from the first luminaire.

19. The system of claim 1, wherein the first I/O device receives power from a driver.

20. The system of claim 1, wherein the first I/O device receives power from an energy storage device.

21. The system of claim 1, wherein the first I/O device receives a low-voltage power.

22. The system of claim 1, wherein the first I/O device receives power over Ethernet.

23. The system of claim 1, wherein at least a portion of the third data set is interpolated.

24. The system of claim 1, wherein the controller is located remotely from the first luminaire housing and the second luminaire housing.

25. The system of claim 1, wherein the controller is located within at least one selected from a group consisting of the first luminaire housing and the second luminaire housing.

26. The system of claim 1, wherein the controller is integrated into at least one selected from a group consisting of a building management system, a fire alarm system, an infrastructure system, a lighting control system, an imaging application, a microphone application, a sensor application, an environmental sensing system, and a location and/or wayfinding system.

27. The system of claim 1, wherein the first data set relates to a human movement at the first location.

28. The system of claim 27, wherein the human movement is a gesture control for controlling the system.

29. The system of claim 27, wherein the human movement is an emergency gesture.

30. The system of claim 27, wherein the human movement relates to an aggressive human behavior.

31. The system of claim 1, further comprising an external device communicatively coupled to the controller.

32. The system of claim 31, wherein the external device is configured to provide control signals to the system.

33. The system of claim 1, wherein the controller is further configured to determine a presence of a person based on at least one of the first data set and the second data set.

34. The system of claim 1, wherein the first data set relates to a characteristic of one or more plants.

35. The system of claim 34, wherein the controller is further configured to control, based on the characteristic, at least one selected from a group consisting of an irrigation system and a fertigation system.

36. The system of claim 34, wherein the characteristic is at least one selected from a group consisting of a color and a growth stage.

\* \* \* \* \*